(12) United States Patent
Rapaka et al.

(10) Patent No.: US 9,712,832 B2
(45) Date of Patent: **\*Jul. 18, 2017**

(54) INDICATION OF CROSS-LAYER PICTURE TYPE ALIGNMENT IN MULTI-LAYER VIDEO CODING

(71) Applicant: QUALCOMM Incorporated, San Diego, CA (US)

(72) Inventors: Krishnakanth Rapaka, San Diego, CA (US); Ye-Kui Wang, San Diego, CA (US); Jianle Chen, San Diego, CA (US); Marta Karczewicz, San Diego, CA (US)

(73) Assignee: QUALCOMM Incorporated, San Diego, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/425,738

(22) Filed: Feb. 6, 2017

(65) Prior Publication Data

US 2017/0171550 A1 Jun. 15, 2017

Related U.S. Application Data

(63) Continuation of application No. 14/254,400, filed on Apr. 16, 2014, now Pat. No. 9,602,822.

(Continued)

(51) Int. Cl.
*H04N 19/187* (2014.01)
*H04N 19/172* (2014.01)
(Continued)

(52) U.S. Cl.
CPC ......... *H04N 19/187* (2014.11); *H04N 19/172* (2014.11); *H04N 19/188* (2014.11); *H04N 19/30* (2014.11); *H04N 19/70* (2014.11)

(58) Field of Classification Search
CPC .... H04N 19/13; H04N 19/172; H04N 19/187; H04N 19/188; H04N 19/30; H04N 19/70
(Continued)

(56) References Cited

U.S. PATENT DOCUMENTS

2010/0150224 A1 6/2010 Pateux et al.
2012/0183076 A1 7/2012 Boyce et al.
(Continued)

OTHER PUBLICATIONS

Chen et al., "MV-HEVC/SHVC HLS: On restriction and indication of cross-layer IRAP picture distribution," JCT-VC Meeting; Jul. 25-Aug. 2, 2013; Vienna, AT (Joint Collaborative Team on Video Coding of ISO/IEC JTC1/SC29/WG11 and ITU-T SG.16); URL: http://wftp3.itu.int/av-arch/jctvc-site/, No. JCTVC-N0147, Jul. 16, 2013, XP030114616, 3 pp.
(Continued)

*Primary Examiner* — William C Vaughn, Jr.
*Assistant Examiner* — Naod Belai

(57) ABSTRACT

In one example, the disclosure is directed to techniques that include receiving a bitstream comprising at least a syntax element, a first network abstraction layer unit type, and a coded access unit comprising a plurality of pictures. The techniques further include determining a value of the syntax element which indicates whether the access unit was coded using cross-layer alignment. The techniques further include determining the first network abstraction layer unit type for a picture in the access unit and determining whether the first network abstraction layer unit type equals a value in a range of type values. The techniques further include setting a network abstraction layer unit type for all other pictures in the coded access unit to equal the value of the first network abstraction layer unit type if the first network abstraction layer unit type is equal to a value in the range of type values.

24 Claims, 6 Drawing Sheets

Related U.S. Application Data

(60) Provisional application No. 61/813,120, filed on Apr. 17, 2013.

(51) Int. Cl.
*H04N 19/169* (2014.01)
*H04N 19/30* (2014.01)
*H04N 19/70* (2014.01)

(58) Field of Classification Search
USPC .......................................................... 375/240
See application file for complete search history.

(56) References Cited

U.S. PATENT DOCUMENTS

| | | | |
|---|---|---|---|
| 2013/0272372 A1 | 10/2013 | Hannuksela et al. | |
| 2013/0272430 A1 | 10/2013 | Sullivan et al. | |
| 2014/0086334 A1 | 3/2014 | Haque et al. | |
| 2014/0218473 A1 | 8/2014 | Hannuksela et al. | |
| 2014/0301451 A1* | 10/2014 | Deshpande .......... | H04N 19/597 375/240.12 |
| 2014/0301476 A1 | 10/2014 | Deshpande et al. | |
| 2014/0314140 A1 | 10/2014 | Rapaka et al. | |
| 2015/0139338 A1 | 5/2015 | Samuelsson et al. | |
| 2016/0080747 A1* | 3/2016 | Choi ...................... | H04N 19/70 375/240.12 |
| 2016/0088306 A1 | 3/2016 | Sjöberg et al. | |

OTHER PUBLICATIONS

Choi et al., "MV-HEVC/SHVC HLS: On parameter improvements," Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, Document: JCTVC-P0068r2, Jan. 14, 2014; 2 pp.
Rapaka et al., "MV-HEVC/SHVC HLS: Comments on latest MV-HEVC and SHVC draft specs," Oct. 23-Nov. 1, 2013; 15th Meeting, Geneva, CH (Joint Collaborative Team on Video Coding of ISO/IEC JTC1/SC29/WG11 and ITU-TSG.16), Document: JCTVC-O0223, Oct. 15, 2013, 5 pp.
Sjoberg et al., "Overview of HEVC High-Level Syntax and Reference Picture Management," IEEE Transactions on Circuits and Systems for Video Technology, vol. 22 (12), XP011487804, Dec. 2012, pp. 1858-1870.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, CH, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_d7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Chen et al., "SHVC Draft Text 1," Working Draft of SHVC, 12th Meeting, Jan. 14-23, 2013, Document: JCTVC-L1008, 34 pp.
Tech et al., "MV-HEVC Draft Text 3 (ISO/IEC 23008-2:201x/PDAM2)," 3rd Meeting, Jan. 17-23, 2013, Document: JCT3V-C1004_d3 34 pp.
ITU-T H.263, Series H: Audiovisual and Multimedia Systems, Infrastructure of audiovisual services—Coding of moving video, Video coding for low bit rate communication, Jan. 2005, 226 pp.
ITU-T Rec. H.261 (Dec. 1990), "Line Transmission on Non-Telephone Signals, Video Codec for Audiovisual Services AT p x 64 kbit/s", Dec. 1990, 32 pp.
ITU-T Rec. H.262 (Jul. 1995), "Transmission on Non-Telephone Signals, Information Technology—Generic Coding of Moving Pictures and Associated Audio Information: Video", Jul. 1995, 211 pp.
International Search Report and Written Opinion from International Application No. PCT/US2014/034523, dated Jul. 15, 2014, 15 pp.
Chen et al., "Scalable High Efficiency Video Coding Draft 3," JCT-VC Meeting; Jul. 25-Aug. 2, 2013; Vienna, AT; (Joint Collaborative Team on Video Coding of ITU-T SG 16 WP 3 and ISO/IEC JTC 1/SC29/WG11); URL: http://wftp3.itu.int/av-arch/jctvc-site/, No. JCTVC-N1008_v1, XP030114953, 70 pp.
Choi et al., "Parameter set and other related issues," JCT-VC Meeting; MPEG Meeting; Apr. 18-26, 2013; Incheon, KR; (Joint Collaborative Team on Video Coding of ITU-T SG 16 WP 3 and ISO/IEC JTC 1/SC29/WG 11); URL: http://wftp3.itu.int/av-arch/jctvc-site/, No. JCTVC-M0167, XP030114124, 4 pp.
Choi et al., "Parameter set and other related issues for MV-HEVC and other HEVC extension," JCT-3V Meeting; Apr. 20-26, 2013; Incheon, KR; (Joint Collaborative Team on Video Coding of ITU-T SG 16 WP 3 and ISO/IEC JTC 1/SC29/WG 11); URL: http://phenix.int-evry.fr/jct2/, No. JCT3V-D0240, XP030130904, 4 pp.
Rapaka et al., "MV-HEVC/SHVC HLS: On Signalling of random accessibility for IRAP pictures in non-IRAP AUs," JCT-3V Meeting; Oct. 23-Nov. 1, 2013; Geneva, CH; (Joint Collaborative Team on Video Coding of ITU-T SG 16 WP 3 and ISO/IEC JTC 1/SC29/WG 11); URL: http://phenix.int-evry.fr/jct2/, No. JCT3V-F0079, XP030131487, 3 pp.
Wang et al., "AHG9: On cross-layer alignments in HEVC 3DV and scalable extensions," JCT-VC Meeting; MPEG Meeting; Apr. 218-26 2013; Incheon, KR; (Joint Collaborative Team on Video Coding of ITU-T SG 16 WP 3 and ISO/IEC JTC 1/SC29/WG 11); Retrieved from the Internet No. JCTVC-M0266, XP030114223, 6 pp.
Wang et al., "AHG9: On some fundamental concepts in HEVC 3DV and scalable extensions," JCT-VC Meeting; MPEG Meeting; Apr. 18-26, 2013; Incheon, KR; (Joint Collaborative Team on Video Coding of ITU-T SG 16 WP 3 and ISO/IEC JTC 1/SC29/WG 11); URL: http://wftp3.itu.int/av-arch/jctvc-site/, No. JCTVC-M0264, XP030114221, 3 pp.
Wang et al., "MV-HEVC/SHVC HLS: On cross-layer alignments in HEVC 3DV and scalable extensions," JCT-3V Meeting; Apr. 20-26, 2013; Incheon, KR; (Joint Collaborative Team on Video Coding of ISO/IEC JTC1/SC29/WG11 and ITU-T SG.16); URL: http://phenix.int-evry.fr/JCT2/, No. JCT3V-D0046, XP030130710, 6 pp.
Response to Written Opinion dated Jul. 15, 2014, from International Application No. PCT/US2014/034523, filed on Nov. 25, 2014, 7 pp.
Second Written Opinion from International Application No. PCT/US2014/034523, dated Mar. 3, 2015, 10 pp.
Response to Second Written Opinion dated Mar. 3, 2015, from International Application No. PCT/US2014/034523, filed on May 1, 2015, 36 pp.

(56) References Cited

OTHER PUBLICATIONS

International Preliminary Report on Patentability from International Application No. PCT/US2014/034523, dated Jun. 2, 2015, 11 pp.
U.S. Appl. No. 15/425,676, filed Feb. 6, 2017, filed by Rapaka et al.

* cited by examiner

INDICATION OF CROSS-LAYER PICTURE TYPE ALIGNMENT IN MULTI-LAYER VIDEO CODING

This application is a continuation of U.S. application Ser. No. 14/254,400, filed Apr. 16, 2014, which claims the benefit of U.S. Provisional Application No. 61/813,120, filed Apr. 17, 2013, the entire content of which is incorporated herein by reference.

TECHNICAL FIELD

The disclosure relates to video coding and compression.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the disclosure describes techniques for indications of cross-layer alignment of picture types in a way that the indication is easily accessible by different entities in media transmission and application systems when cross-layer picture types may not aligned within the access unit.

In one example, the disclosure is directed to a method that includes receiving a bitstream, wherein the bitstream comprises at least a syntax element, a first network abstraction layer unit type, and a coded access unit, wherein the coded access unit comprises a plurality of pictures, determining a value of a syntax element, wherein the syntax element includes an indication of whether the access unit was coded using cross-layer alignment, in response to determining that the syntax element indicates cross-layer alignment, determining a first network abstraction layer unit type for a picture in the access unit, determining whether the first network abstraction layer unit type is equal to a value in a predetermined range of type values, and, in response to determining that the first network abstraction layer unit type is equal to a value in the predetermined range of type values, setting a network abstraction layer unit type for all other pictures in the coded access unit to be equal to the value of the first network abstraction layer unit type. In some examples, a network abstraction layer unit type may be set for any reference layer pictures, direct and/or indirect, that belong to the access unit.

In another example, the disclosure is directed to a video coding device that comprises a video decoder configured to receive a bitstream, wherein the bitstream comprises at least a syntax element, a first network abstraction layer unit type, and a coded access unit, wherein the coded access unit comprises a plurality of pictures, determine a value of a syntax element, wherein the syntax element includes an indication of whether the access unit was coded using cross-layer alignment, in response to determining that the syntax element indicates cross-layer alignment, determine a first network abstraction layer unit type for a picture in the access unit, determine whether the first network abstraction layer unit type is equal to a value in a predetermined range of type values, and, in response to determining that the first network abstraction layer unit type is equal to a value in the predetermined range of type values, set a network abstraction layer unit type for all other pictures in the coded access unit to be equal to the value of the first network abstraction layer unit type. In some examples, a network abstraction layer unit type may be set for any reference layer pictures, direct and/or indirect, that belong to the access unit.

In another example, the disclosure is directed to an apparatus for coding video comprising means for receiving a bitstream, wherein the bitstream comprises at least a syntax element, a first network abstraction layer unit type, and a coded access unit, wherein the coded access unit comprises a plurality of pictures, means for determining a value of a syntax element, wherein the syntax element includes an indication of whether the access unit was coded using cross-layer alignment, means for determining a first network abstraction layer unit type for a picture in the access unit in response to determining that the syntax element indicates cross-layer alignment, means for determining whether the first network abstraction layer unit type is equal to a value in a predetermined range of type values, and means for setting a network abstraction layer unit type for all other pictures in the coded access unit to be equal to the value of the first network abstraction layer unit type in response to determining that the first network abstraction layer unit type is equal to a value in the predetermined range of type values. In some examples, a network abstraction layer unit type may be set for any reference layer pictures, direct and/or indirect, that belong to the access unit.

In another example, the disclosure is directed to a computer-readable storage medium storing instructions thereon that, when executed, cause one or more processors of a device for coding video data to receive a bitstream, wherein the bitstream comprises at least a syntax element, a first network abstraction layer unit type, and a coded access unit, wherein the coded access unit comprises a plurality of pictures, determine a value of a syntax element, wherein the syntax element includes an indication of whether the access unit was coded using cross-layer alignment, in response to determining that the syntax element indicates cross-layer alignment, determine a first network abstraction layer unit type for a picture in the access unit, determine whether the first network abstraction layer unit type is equal to a value in a predetermined range of type values, and, in response to determining that the first network abstraction layer unit type is equal to a value in the predetermined range of type values, set a network abstraction layer unit type for all other pictures in the coded access unit to be equal to the value of the first network abstraction layer unit type.

In another example, the disclosure is directed to a method that includes encoding an access unit, wherein the access unit comprises a plurality of pictures, generating a syntax element to indicate cross-layer alignment of the access unit, generating a first network abstraction layer unit type for a picture in the access unit, and outputting a bitstream, wherein the bitstream comprises at least the coded access unit, the syntax element, and the first network abstraction layer unit type.

In another example, the disclosure is directed to a video coding device that comprises a video encoder configured to encode an access unit, wherein the access unit comprises a plurality of pictures, generate a syntax element to indicate cross-layer alignment of the access unit, generate a first network abstraction layer unit type for a picture in the access unit, and output a bitstream, wherein the bitstream comprises at least the coded access unit, the syntax element, and the first network abstraction layer unit type.

In another example, the disclosure is directed to an apparatus for coding video comprising means for encoding an access unit, wherein the access unit comprises a plurality of pictures, means for generating a syntax element to indicate cross-layer alignment of the access unit, means for generating a first network abstraction layer unit type for a picture in the access unit, and means for outputting a bitstream, wherein the bitstream comprises at least the coded access unit, the syntax element, and the first network abstraction layer unit type.

In another example, the disclosure is directed to a computer-readable storage medium storing instructions thereon that, when executed, cause one or more processors of a device for coding video data to encode an access unit, wherein the access unit comprises a plurality of pictures, generate a syntax element to indicate cross-layer alignment of the access unit, generate a first network abstraction layer unit type for a picture in the access unit, and output a bitstream, wherein the bitstream comprises at least the coded access unit, the syntax element, and the first network abstraction layer unit type.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
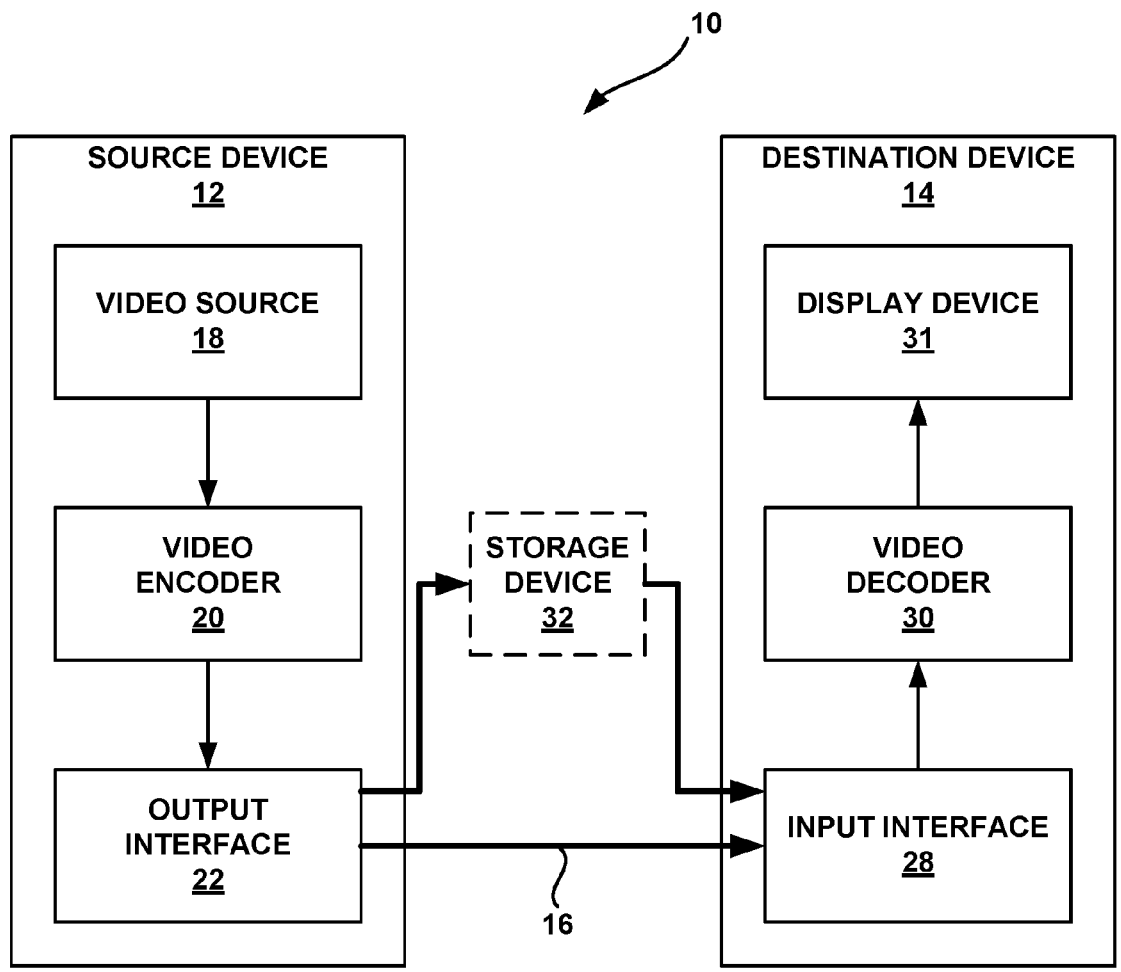
FIG. 1 is a block diagram illustrating an example video encoding and decoding system that may utilize the techniques described in this disclosure.

This disclosure describes methods to indicate the alignment of cross-layer picture types for multi-layer video coding. More specifically, methods for indications of cross-layer alignment of IRAP picture types, leading pictures types, trailing picture types, TSA pictures types, and STSA pictures types are disclosed. Various devices, systems, computer-readable media that use the methods, are also described.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multi-view Video Coding (MVC) extensions, and ITU-T H.265.

SVC and MVC do not require cross-layer alignment of the defined picture types across layers and a lot of picture types defined in HEVC are not defined in AVC/SVC/MVC. Currently, in SHVC WD1 and MV-HEVC WD3, CRA pictures are not required to be cross-layer aligned. Not requiring the cross-layer picture type alignment may be beneficial for some usage case scenarios. For example, not requiring CRA picture alignment would benefit in the scenarios that require frequent random accessing with higher efficiency at lower layers than higher layers, or frequent random accessing with higher efficiency at higher layers than lower layers. In these cases, cross-layer alignment of pictures types may disallow efficient use of pictures across the layers that may result in loss of coding efficiency or increasing random access delays.

SHVC WD1 and MV-HEVC WD3 currently require cross-layer alignment of BLA pictures, and they do not require cross-layer alignment of IDR pictures, RASL picture, RADL picture, TSA pictures and STSA pictures. It is possible that future versions of SHVC and MV-HEVC may allow non-cross-layer-aligned IDR pictures for the same reason as for CRA pictures.

In some examples, this document may assume some concepts of (coded) picture, access unit (AU), IRAP AU, coded video sequence (CVS), and bitstream, although the methods also apply if some of these assumptions are changed. Throughout this disclosure, a (coded) picture may be similar to the current (coded) picture definition, where a coded picture is equivalent to a layer representation in SVC, a view component in MVC and a texture or depth view component in MVC+D. An access unit may be similar to an access unit as in SVC and MVC, which consists of all the coded pictures associated with the same output time and their associated non-VCL NAL units. An TRAP access unit may be an access unit in which all the coded pictures are TRAP pictures. A CVS may be a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an TRAP access unit with NoRaslOutputFlag equal to 1. A bitstream may be a sequence of bits, in the form of a NAL unit stream or a byte stream, that forms the representation of one or more CVSs, and the first access unit in the bitstream may be an TRAP access unit.

In spite of advantages mentioned above for allowing for non-cross-layer-aligned picture types such as CRA pictures and IDR pictures, however, if a bitstream is encoded with one or more all picture types cross-layer aligned, it may be beneficial for system entities, such as servers and media-aware network elements (MANEs), also referred to as intelligent media gateways, to know and make use of this information.

For example, if a MANE is informed that CRA or IDR pictures are cross-layer aligned, then it does not need to wait for the reception of all pictures of an access unit and parse them and then determine that the current access unit provides full random accessibility to all layers thus can be used for simple random access to any set of layers, splicing with any set of layers, and switching to any layer.

Therefore, it would be desirable to provide mechanisms for indications of cross-layer alignment of picture types in a way that the indication is easily accessible by different entities in media transmission and application systems. Also, it may be desirable to design such mechanisms in a way that does not require entropy decoding or other parsing associated with video decompression, since network elements (such as a MANE) may not perform entropy decoding or other parsing associated with video decompression.

In general, a syntax element (e.g., a flag named vps_cross_layer_irap_align_flag) for indication of cross-layer alignment of a particular picture type or a particular set of picture types is signaled in the VPS (e.g., in the VPS extensions, such as the VPS), and the syntax element may be designed and interpreted with certain semantics. In some examples, when the syntax element is signaled to equal 0, bitstream restrictions, such as those listed below, may or may not be applied. In other words, in some examples, if the syntax element is equal to 0, then within a CVS that refers to the VPS, all VCL NAL units in each AU may or may not have the same value of nal_unit_type. In other examples, if the syntax element is equal to 0, then within a CVS that refers to the VPS, all VCL NAL units in a specific range of VCL NAL units may or may not have the same value of nal_unit_type.

In some examples, when the syntax element is equal to 1, within a CVS that refers to the VPS, when the nal_unit_type of one VCL NAL unit in an AU is equal to a particular type of NAL unit type (or a value that is one of a particular set of NAL unit type values), all VCL NAL units in the AU have the same value of nal_unit_type. In some examples, when the syntax element is equal to 1, within a CVS that refers to the VPS, each reference picture in the same access unit as has the same value of nal_unit_type as the picture initially referenced.

In some examples, the syntax element may be equal to 1, which may specify that within a CVS that refers to the VPS, when nal_unit_type of one VCL NAL unit in an AU is in the range of BLA_W_LP . . . RSV_IRAP_VCL23 (16 to 23, inclusive), all VCL units in the AU have the same value of nal_unit_type. Specifically, when the syntax element is equal to 1, a bitstream restriction may apply. The bitstream restriction may be that, when one picture in an AU has nal_unit_type nutA in the range of BLA_W_LP . . . RSV_IRAP_VCL23 (16 to 23, inclusive), any other picture in the same access unit shall have nal_unit_type equal to nutA. In some examples, when the syntax element is equal to 1, within a CVS that refers to the VPS, each reference picture in the same access unit as has the same value of nal_unit_type as the picture initially referenced.

Alternatively, in examples where the syntax element may equal 0, within a CVS that refers to the VPS, when nal_unit_type of one VCL NAL unit in an AU is in the range of BLA_W_LP . . . RSV_IRAP_VCL23, all VCL NAL units in the AU may or may not have the same value of nal_unit_type. This method may be applied independently by itself or together with the methods described in the other examples.

In some examples, the syntax element may be equal to 1, which may specify that within a CVS that refers to the VPS, when nal_unit_type of one VCL NAL unit in an AU is equal to IDR_W_RADL or IDR_N_LP (19 or 20), all VCL units in the AU have the same value of nal_unit_type. Specifically, when the syntax element is equal to 1, a bitstream restriction may apply. The bitstream restriction may be that, when one picture in an AU has nal_unit_type nutA is equal to IDR_W_RADL or IDR_N_LP (19 or 20), any other picture in the same access unit shall have nal_unit_type equal to nutA. In some examples, when the syntax element is equal to 1, within a CVS that refers to the VPS, each reference picture in the same access unit as has the same value of nal_unit_type as the picture initially referenced.

Alternatively, in examples where the syntax element may equal 0, within a CVS that refers to the VPS, when nal_unit_type of one VCL NAL unit in an AU is equal to IDR_W_RADL or IDR_N_LP (19 or 20), all VCL NAL units in the AU may or may not have the same value of nal_unit_type. This method may be applied independently by itself or together with the methods described in the other examples.

In some examples, the syntax element may be equal to 1, which may specify that within a CVS that refers to the VPS, when nal_unit_type of one VCL NAL unit in an AU is in the range of TRAIL_N . . . RSV_VCL31 (0 to 31, inclusive), all VCL units in the AU have the same value of nal_unit_type. Specifically, when the syntax element is equal to 1, a bitstream restriction may apply. The bitstream restriction may be that, when one picture in an AU has nal_unit_type nutA in the range of TRAIL_N . . . RSV_VCL31 (0 to 31, inclusive), any other picture in the same access unit shall have nal_unit_type equal to nutA. In some examples, when the syntax element is equal to 1, within a CVS that refers to the VPS, each reference picture in the same access unit as has the same value of nal_unit_type as the picture initially referenced.

Alternatively, in examples where the syntax element may equal 0, within a CVS that refers to the VPS, when nal_unit_type of one VCL NAL unit in an AU is in the range of TRAIL_N . . . RSV_VCL31 (0 to 31, inclusive), all VCL NAL units in the AU may or may not have the same value of nal_unit_type. This method may be applied independently by itself or together with the methods described in the other examples.

In some examples, the syntax element may be equal to 1, which may specify that within a CVS that refers to the VPS, when nal_unit_type of one VCL NAL unit in an AU is in the range of BLA_W_LP . . . BLA_N_LP (16 to 18, inclusive), all VCL units in the AU have the same value of nal_unit_type. Specifically, when the syntax element is equal to 1, a bitstream restriction may apply. The bitstream restriction may be that, when one picture in an AU has nal_unit_type nutA in the range of BLA_W_LP . . . BLA_N_LP (16 to 18, inclusive), any other picture in the same access unit shall have nal_unit_type equal to nutA. In some examples, when the syntax element is equal to 1, within a CVS that refers to the VPS, each reference picture in the same access unit as has the same value of nal_unit_type as the picture initially referenced.

Alternatively, in examples where the syntax element may equal 0, within a CVS that refers to the VPS, when nal_unit_type of one VCL NAL unit in an AU is in the range of BLA_W_LP . . . BLA_N_LP (16 to 18, inclusive), all VCL NAL units in the AU may or may not have the same value of nal_unit_type. This method may be applied independently by itself or together with the methods described in the other examples.

In some examples, the syntax element may be equal to 1, which may specify that within a CVS that refers to the VPS, when nal_unit_type of one VCL NAL unit in an AU is equal to CRA_NUT (21), all VCL units in the AU have the same value of nal_unit_type. Specifically, when the syntax element is equal to 1, a bitstream restriction may apply. The bitstream restriction may be that, when one picture in an AU has nal_unit_type nutA is equal to CRA_NUT (21), any other picture in the same access unit shall have nal_unit_type equal to nutA. In some examples, when the syntax element is equal to 1, within a CVS that refers to the VPS, each reference picture in the same access unit as has the same value of nal_unit_type as the picture initially referenced.

Alternatively, in examples where the syntax element may equal 0, within a CVS that refers to the VPS, when nal_unit_type of one VCL NAL unit in an AU is in the range of is equal to CRA_NUT (21), all VCL NAL units in the AU may or may not have the same value of nal_unit_type. This method may be applied independently by itself or together with the methods described in the other examples.

In some examples, the syntax element may be signaled in an SEI message or the SPS. It may be advantageous for the syntax element to be signaled in a position in a NAL unit that does not need entropy decoding to access the syntax element, e.g., before any entropy coded (e.g., ue(v)-coded) syntax element, or after some entropy-coded syntax elements but parsing of this syntax element does not need to parse those entropy-coded syntax elements such as in the beginning of the VPS extension syntax.

In addition to the examples presented above, nal_unit_type may be compared to other values or ranges to determine if a bitstream restriction may be applied. For example, the particular value of NAL unit type may be RADL_N (6). As yet another example, the particular set of NAL unit type values may be RASD_N and RASD_R (6 and 7). As yet another example, the particular set of NAL unit type values may be RADL_N, RADL_R, RASL_N, and RASL_R (6, 7, 8, and 9).

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2, ITU-T H.263, and ITU-T H.265.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Likewise, system 10, including source device 12, destination device 14, link 16 and storage device 32 may be included in a single device such as a wireless handset, personal computer, tablet, or the like.

Video encoder 20 and video decoder 30 may be configured to implement techniques of the current disclosure. For instance, in some examples, video encoder 20 may be configured to encode an access unit, wherein the access unit comprises a plurality of pictures, generate a syntax element to indicate cross-layer alignment of the access unit, generate a first network abstraction layer unit type for a picture in the access unit, and output a bitstream, wherein the bitstream comprises at least the coded access unit, the syntax element, and the first network abstraction layer unit type. Further, in some examples, video decoder 30 may be configured to receive a bitstream, wherein the bitstream comprises at least a syntax element, a first network abstraction layer unit type, and a coded access unit, wherein the coded access unit comprises a plurality of pictures, determine a value of the syntax element, wherein the syntax element includes an indication of whether the access unit was coded using cross-layer alignment, in response to determining that the syntax element indicates cross-layer alignment, determine the first network abstraction layer unit type for a picture in the access unit, determine whether the first network abstraction layer unit type is equal to a value in a predetermined range of type values, and, in response to determining that the first network abstraction layer unit type is equal to a value in the predetermined range of type values, set a network abstraction layer unit type for all other pictures in the coded access unit to be equal to the value of the first network abstraction layer unit type.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices.

Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may comprise various components that perform techniques of this disclosure. For instance, video encoder 20 may comprise an entropy encoding unit. Entropy encoding unit may perform techniques of the current disclosure. For instance, in some examples, entropy encoding unit may generate a syntax element to indicate cross-layer alignment of an access unit. In some examples, entropy encoding unit may also generate a first network abstraction layer unit type for a picture in the access unit. These steps may also be performed by other components. For instance, output interface 22 may comprise a post-processing unit which may perform these steps.

Video decoder 30 may comprise various components that perform techniques of this disclosure. For instance, video decoder 30 may comprise an entropy decoding unit. In some examples, entropy decoding unit may determine a value of the syntax element, wherein the syntax element includes an indication of whether the access unit was coded using cross-layer alignment. Entropy decoding unit may also determine the first network abstraction layer unit type for a picture in the access unit in response to determining that the syntax element indicates cross-layer alignment. Entropy decoding unit may determine whether the first network abstraction layer unit type is equal to a value in a predetermined range of type values. Further, in response to determining that the first network abstraction layer unit type is equal to a value in the predetermined range of type values, entropy decoding unit may set a network abstraction layer unit type for all other pictures in the coded access unit to be equal to the value of the first network abstraction layer unit type. These steps may also be performed by other devices. For instance, in some examples, input interface 28 may comprise a network device which may perform these steps.

In one example, the disclosure is directed to a method that includes receiving a bitstream, wherein the bitstream comprises at least a syntax element, a first network abstraction layer unit type, and a coded access unit, wherein the coded access unit comprises a plurality of pictures, determining a value of a syntax element, wherein the syntax element includes an indication of whether the access unit was coded using cross-layer alignment, in response to determining that the syntax element indicates cross-layer alignment, determining a first network abstraction layer unit type for a picture in the access unit, determining whether the first network abstraction layer unit type is equal to a value in a predetermined range of type values, and, in response to determining that the first network abstraction layer unit type is equal to a value in the predetermined range of type values, setting a network abstraction layer unit type for all other pictures in the coded access unit to be equal to the value of the first network abstraction layer unit type.

Figure 2:
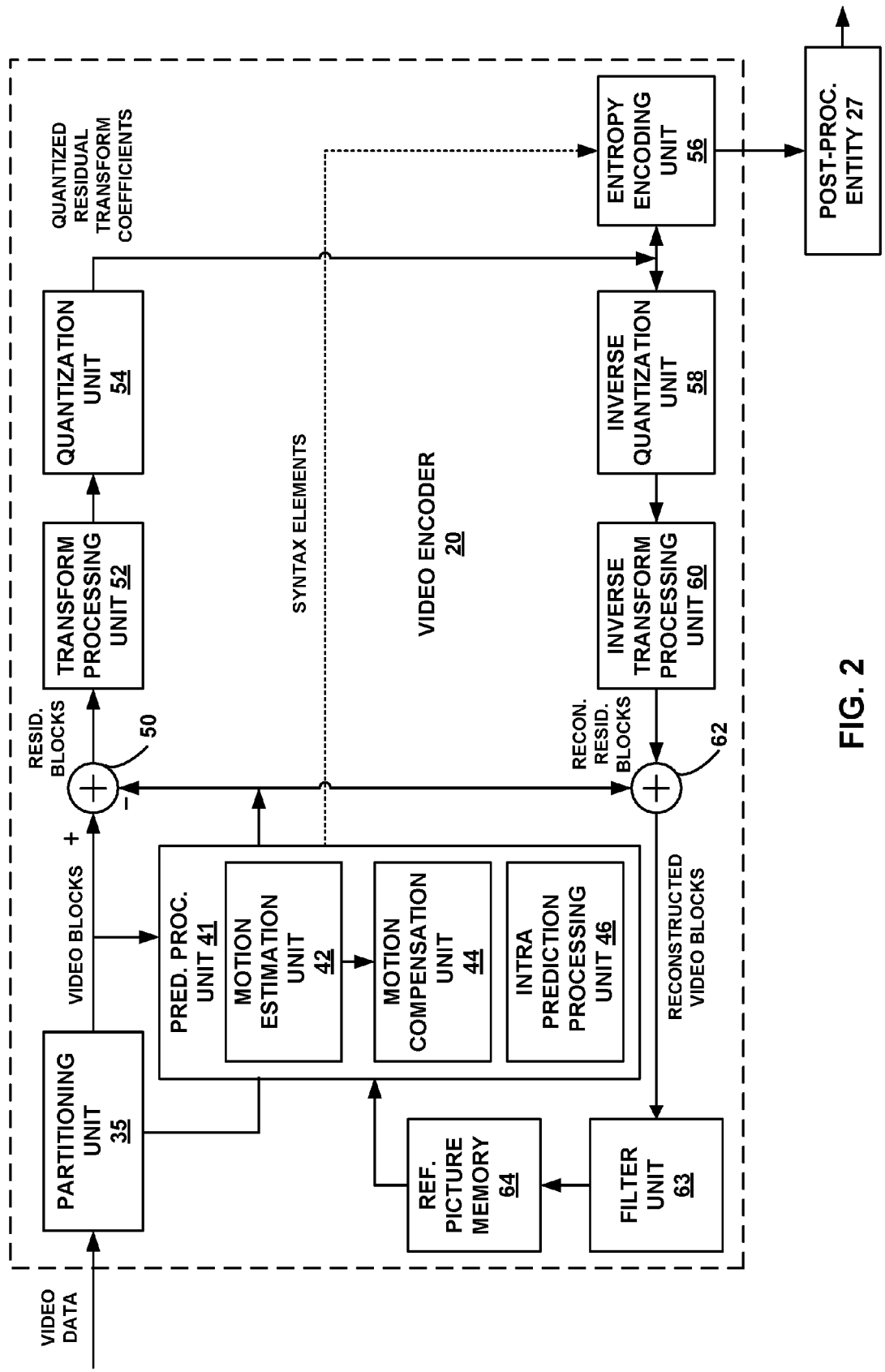
FIG. 2 is a block diagram illustrating an example of a video encoder that may implement the techniques described in this disclosure.

FIG. 2 is a block diagram illustrating an example of a video encoder that may implement the techniques described in this disclosure. Video encoder 20 may be configured to output video to post processing entity 27, which is another example device that may implement the techniques described in this disclosure. Post processing entity 27 is intended to represent an example of a video entity, such as a media aware network element (MANE), a splicing/editing device or another intermediate device that may process encoded video data from video encoder 20. In some instances, post processing entity may be an example of a network entity. In some video encoding systems, post-processing entity 27 and video encoder 20 may be parts of separate devices, while, in other instances, the functionality described with respect to post-processing entity 27 may be performed by the same device that comprises video encoder 20. In some examples, video encoder 20 may output a bitstream to post processing entity 27, and the bitstream may comprise at least a coded access unit, a syntax element, and a first network abstraction layer unit type.

Post-processing entity 27 may perform techniques of the current disclosure. For instance, in some examples, post-processing entity 27 may generate a syntax element to indicate cross-layer alignment of an access unit. In some examples, post-processing entity 27 may also generate a first network abstraction layer unit type for a picture in the access unit.

In one example, post-processing entity 27 may receive coded access unit. If the coded access unit was encoded using cross-layer alignment, post-processing entity 27 may generate a syntax element to indicate that cross-layer alignment was used. Post-processing entity 27 may also generate a first network abstraction layer unit type for a picture in the access unit which, if it is in a predetermined range, may indicate that all pictures in the access unit should be decoded using the same network abstraction layer unit type.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction unit 41, filter unit 63, reference picture memory 64, summer 50, transform processing unit 52, quantization unit 54, and entropy encoding unit 56. Prediction unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the bitstream may be transmitted to video decoder 30, or archived for later transmission or retrieval by video decoder 30. Entropy encoding unit 56 may also entropy encode the motion vectors and the other syntax elements for the current video slice being coded. Entropy encoding unit 56 may perform techniques of the current disclosure. For instance, in some examples, entropy encoding unit 56 may generate a syntax element to indicate cross-layer alignment of an access unit. In some examples, entropy encoding unit 56 may also generate a first network abstraction layer unit type for a picture in the access unit. The generated syntax elements, however, may be generated in such a way that ensures the ability to parse or interpret the syntax elements (such as by a MANE) without needing to perform entropy decoding or a full decompression of the bitstream. For example, the specific syntax elements that can be parsed without needing to perform entropy decoding or a full decompression of the bitstream may be coded with fixed length codes or other techniques that do not require entropy decoding capabilities. These steps may also be performed by other components. For instance, post-processing unit 27 may perform these steps.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 of FIG. 2 represents an example of a video encoder configured to implement one or more of the techniques set forth herein. For instance, video encoder 20 may be configured encode an access unit, wherein the access unit comprises a plurality of pictures, generate a syntax element to indicate cross-layer alignment of the access unit, generate a first network abstraction layer unit type for a picture in the access unit, and output a bitstream, wherein the bitstream comprises at least the coded access unit, the syntax element, and the first network abstraction layer unit type.

Figure 3:
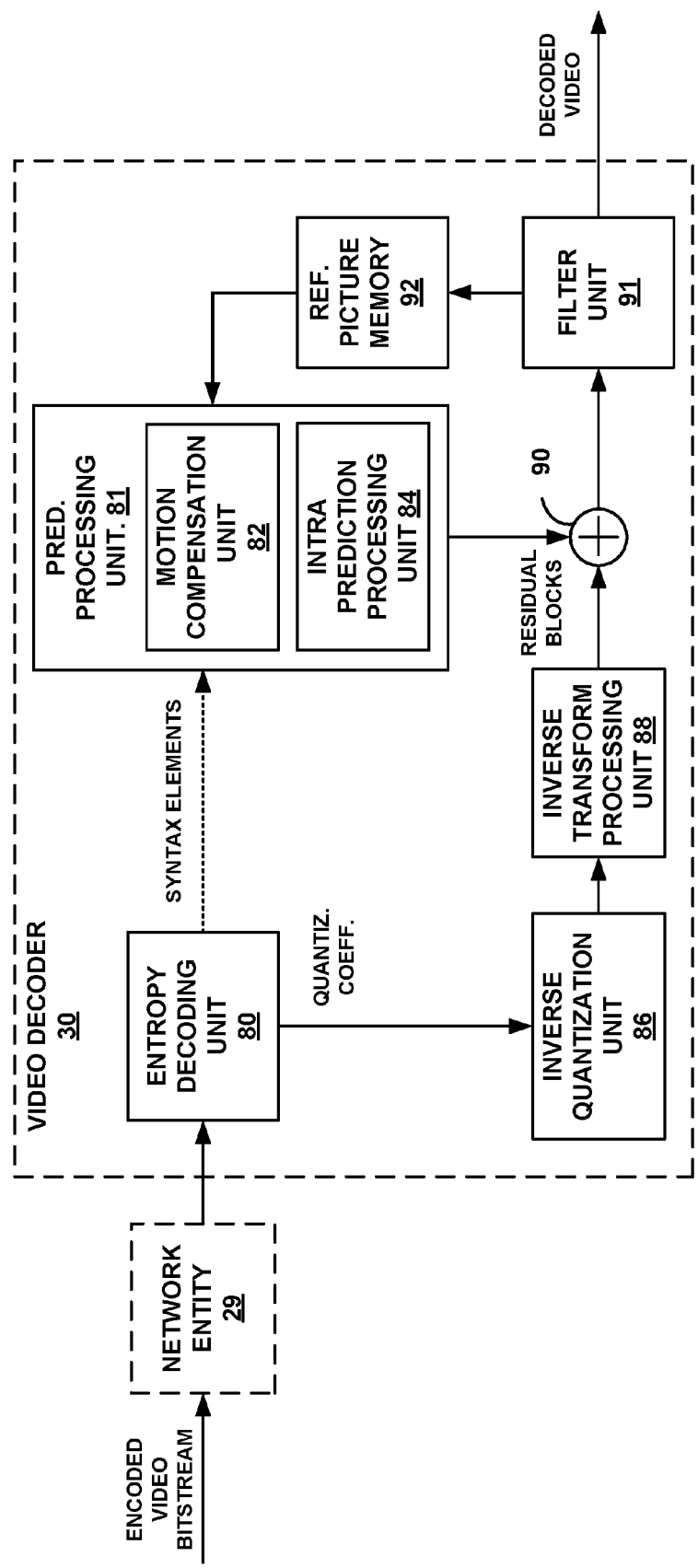
FIG. 3 is a block diagram illustrating an example video decoder that may implement the techniques described in this disclosure.

FIG. 3 is a block diagram illustrating an example video decoder that may implement the techniques described in this disclosure. In the example of FIG. 3, video decoder 30 includes an entropy decoding unit 80, prediction processing unit 81, inverse quantization unit 86, inverse transformation unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives a video bitstream that represents video blocks of an encoded video slice and associated syntax elements from video encoder 20. Video decoder 30 may receive the video bitstream from network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network 29 transmitting the video bitstream to video decoder 30. In some video decoding systems, network entity 29 and video decoder 30 may be parts of separate devices, while in other instances, the functionality described with respect to network entity 29 may be performed by the same device that comprises video decoder 30. In some examples, the bitstream comprises at least a syntax element, a first network abstraction layer unit type, and a coded access unit.

Network entity 29 may determine other aspects of the bitstream. In some examples, network entity 29 may determine a value of the syntax element, wherein the syntax element includes an indication of whether the access unit was coded using cross-layer alignment. Network entity 29 may also determine the first network abstraction layer unit type for a picture in the access unit in response to determining that the syntax element indicates cross-layer alignment. Network entity 29 may determine whether the first network abstraction layer unit type is equal to a value in a predetermined range of type values. Further, in response to determining that the first network abstraction layer unit type is equal to a value in the predetermined range of type values, network entity 29 may set a network abstraction layer unit type for all other pictures in the coded access unit to be equal to the value of the first network abstraction layer unit type.

In one example, network entity 29 may receive a bitstream from video encoder 20 or post-processing unit 27, as depicted in FIG. 2. The bitstream may comprise at least a syntax element, a first network abstraction layer unit type, and a coded access unit. Network entity 29 may read the syntax element and the first network abstraction layer unit type, both of which may be added to the bitstream outside of the entropy encoding process and which may be decoded outside of the entropy decoding process. Network entity 29 may determine a value for the syntax element. If the syntax element is equal to a value that indicates cross-layer alignment was used in encoding the access unit, network entity 29 may determine a value for the first network abstraction layer unit type to see if the first network abstraction layer unit type is equal to a value in a predetermined range indicated in a bitstream restriction. If the first network abstraction layer unit type is in the predetermined range, then network entity 29 may set a network abstraction layer unit type for all other pictures to be equal to the first network abstraction layer unit type.

Performing these steps in network entity 29 may have numerous advantages. For example, if network entity 29 is informed that CRA or IDR pictures are cross-layer aligned, then it does not need to wait for the reception of all pictures of an access unit and parse them and then determine that the current access unit provides full random accessibility to all layers thus can be used for simple random access to any set of layers, splicing with any set of layers, and switching to any layer. Further, performing this step outside of the entropy encoding and entropy decoding process may allow an outside device to determine these characteristics without performing any coding operations or a full decompression, thereby improving the efficiency of the overall system.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

Entropy decoding unit 80 may determine other aspects of the bitstream. In some examples, entropy decoding unit 80 may determine a value of the syntax element, wherein the syntax element includes an indication of whether the access unit was coded using cross-layer alignment. Entropy decoding unit 80 may also determine the first network abstraction layer unit type for a picture in the access unit in response to determining that the syntax element indicates cross-layer alignment. Entropy decoding unit 80 may determine whether the first network abstraction layer unit type is equal to a value in a predetermined range of type values. Further, in response to determining that the first network abstraction layer unit type is equal to a value in the predetermined range of type values, entropy decoding unit 80 may set a network abstraction layer unit type for all other pictures in the coded access unit to be equal to the value of the first network abstraction layer unit type. The syntax element and the first network abstraction layer unit type, however, may be generated in the encoding process in such a way that ensures the ability to parse or interpret the syntax elements (such as by a MANE) without needing to perform entropy decoding or a full decompression of the bitstream. For example, the specific syntax elements that can be parsed without needing to perform entropy decoding or a full decompression of the bitstream may be coded with fixed length codes or other techniques that do not require entropy decoding capabilities. In these examples, network device 29 may perform these steps.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

In this manner, video decoder 30 of FIG. 3 represents an example of a video decoder configured to implement one or more of the techniques set forth herein. For instance, video decoder 30 may be configured to receive a bitstream, wherein the bitstream comprises at least a syntax element, a first network abstraction layer unit type, and a coded access unit, wherein the coded access unit comprises a plurality of pictures, determine a value of the syntax element, wherein the syntax element includes an indication of whether the access unit was coded using cross-layer alignment, in response to determining that the syntax element indicates cross-layer alignment, determine the first network abstraction layer unit type for a picture in the access unit, determine whether the first network abstraction layer unit type is equal to a value in a predetermined range of type values, and, in response to determining that the first network abstraction layer unit type is equal to a value in the predetermined range of type values, set a network abstraction layer unit type for all other pictures in the coded access unit to be equal to the value of the first network abstraction layer unit type.

Figure 4:
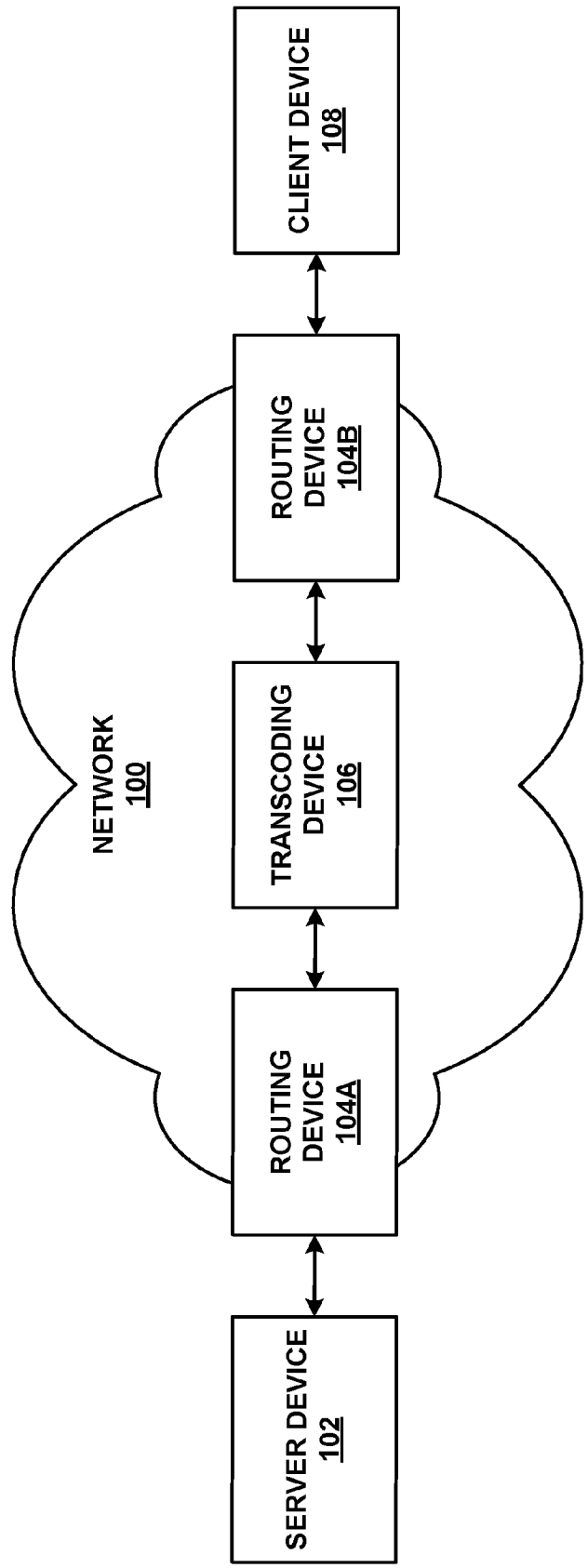
FIG. 4 is a block diagram illustrating one example network in which one or more aspects of this disclosure could be implemented.

FIG. 4 is a block diagram illustrating one example network in which one or more aspects of this disclosure could be implemented. FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

One or more of routing devices 104 may comprise a MANE that uses one or more aspects of this disclosure. In some examples, one or more of routing devices 104 may determine a value of the syntax element, wherein the syntax element includes an indication of whether the access unit was coded using cross-layer alignment. One or more of routing devices 104 may also determine the first network abstraction layer unit type for a picture in the access unit in response to determining that the syntax element indicates cross-layer alignment. One or more of routing devices 104 may determine whether the first network abstraction layer unit type is equal to a value in a predetermined range of type values. Further, in response to determining that the first network abstraction layer unit type is equal to a value in the predetermined range of type values, one or more of routing devices 104 may set a network abstraction layer unit type for all other pictures in the coded access unit to be equal to the value of the first network abstraction layer unit type. These steps may also be performed by other devices. For instance, in some examples, network device 29 may perform these steps.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder 20 illustrated in FIG. 2 and decoder 30 illustrated in FIG. 3 are also exemplary devices that can be configured to perform the techniques of this disclosure.

Figure 5:
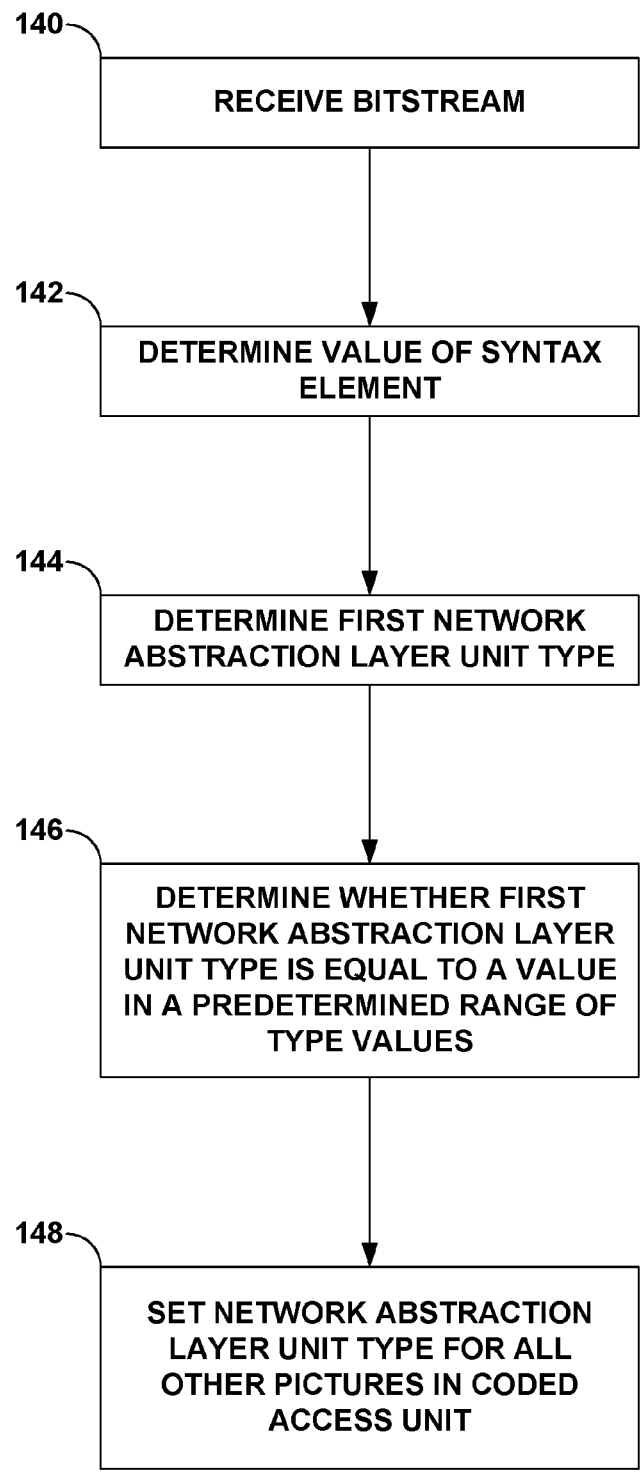
FIG. 5 is a flowchart illustrating an example decoding technique in accordance with one or more techniques described in this disclosure.

FIG. 5 is a flowchart illustrating an example processing technique in accordance with one or more techniques described in this disclosure. In this technique, a video device, such as network entity 29, or entropy decoding unit 80 of video decoder 30, may receive a bitstream (140). In some examples, the bitstream may contain at least a syntax element, a first network abstraction layer type, and a coded access unit.

The video device may determine a value of the syntax element in the bitstream (142). The syntax element may include an indication that the coded access unit was coded using cross-layer alignment. In response to the syntax element indicating that the coded access unit was coded using cross-layer alignment, the video device may determine a value for the first network abstraction layer unit type (144). The video device may determine if the value of the first network abstraction layer unit type is equal to a value in a predetermined range of type values (146). In response to determining that the first network abstraction layer unit type is equal to a value in the predetermined range of type values, the video device may set a network abstraction layer unit type for all other pictures in the coded access unit to be equal to the value of the first network abstraction layer unit type (148).

Figure 6:
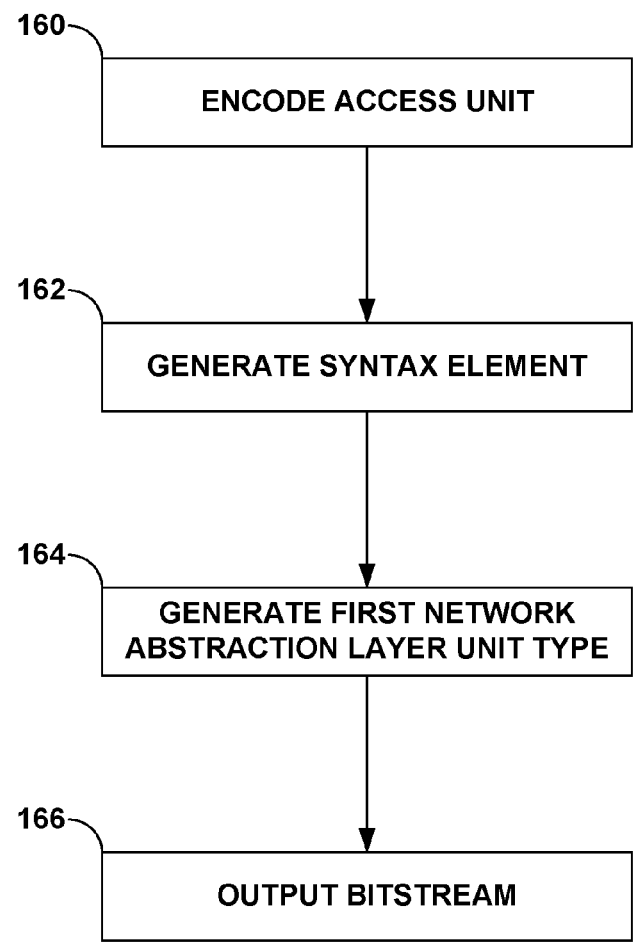
FIG. 6 is a flow chart illustrating an example encoding technique in accordance with one or more techniques described in this disclosure.

FIG. 6 is a flow chart illustrating an example encoding technique in accordance with one or more techniques described in this disclosure. In this technique, a video coding device, such as entropy encoding unit 56 of video encoder 20, may encode an access unit (160). A video device, such as post-processing unit 27 or entropy encoding unit 56 of video encoder 20, may generate a syntax element (162). The syntax element may be an indication that the access unit was coded using cross-layer alignment. The video device may generate a first network abstraction layer unit type for a picture in the access unit (164). The video device may then output a bitstream, wherein the bitstream comprises at least the coded access unit, the syntax element, and the first network abstraction layer unit type (166).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A method of processing video data, the method comprising:
   receiving a bitstream that comprises a Video Parameter Set (VPS) and a Video Coding Layer (VCL) Network Abstraction Layer (NAL) unit, the VPS including a first syntax element, the VCL NAL unit comprising a NAL unit type syntax element, the VCL NAL unit being in an access unit;
   determining, based on the first syntax element being equal to 1 and the NAL unit type syntax element of the VCL NAL unit being equal to IDR_W_RADL or IDR_N_LP, that NAL unit type syntax elements of all VCL NAL units in the access unit have the same value, the VCL NAL units in the access unit being within a coded video sequence (CVS) that refers to the VPS; and
   responsive to determining that one or more pictures in the access unit are cross-layer aligned, performing one of random access or layer switching using any layers of the bitstream.

2. The method of claim 1, wherein the first syntax element is signaled at a position in a NAL unit such that entropy decoding is not needed to access the syntax element.

3. The method of claim 1, wherein the first syntax element is fixed-length coded, and wherein the first syntax element is positioned in a NAL unit before any variable length coded elements in the NAL unit.

4. The method of claim 1, wherein the first syntax element is positioned in a NAL unit such that the first syntax element is after one or more variable length coded elements in the NAL unit and in a beginning of a set of VPS extension syntax.

5. The method of claim 1, wherein the VPS is a first VPS, the method further comprising:
   receiving a second bitstream, wherein the second bitstream comprises a second VPS and a second VCL NAL unit, the second VPS including a second syntax element; and
   determining, based on the second syntax element being equal to 0, each respective NAL unit type syntax element of each VCL NAL units in a second access unit is not restricted to having the same value, the VCL NAL units in the access unit being within a coded video sequence (CVS) that refers to the second VPS.

6. The method of claim 1, wherein the bitstream represent video blocks of an encoded video slice of a picture of the video data and associated syntax elements, the method further comprising: receiving the bitstream at a receiver of a wireless communication device; storing the bitstream in a memory of the wireless communication device; and processing the bitstream on one or more processors of the wireless communication device.

7. The method of claim 6, wherein the wireless communication device comprises a wireless telephone handset and wherein receiving the bitstream at the receiver of the wireless communication device comprises demodulating, according to a wireless communication standard, a signal comprising the bitstream.

8. A device for processing video data, wherein the device comprises:
   a memory configured to store a bitstream that comprises a Video Parameter Set (VPS) and a Video Coding Layer (VCL) Network Abstraction Layer (NAL) unit, the VPS including a first syntax element, the VCL NAL unit comprising a NAL unit type syntax element, the VCL NAL unit being in an access unit; and
   one or more processors configured to determine, based on the first syntax element being equal to 1 and the NAL unit type syntax element of the VCL NAL unit being equal to IDR_W_RADL or IDR_N_LP, that NAL unit type syntax elements of all VCL NAL units in the access unit have the same value, the VCL NAL units in the access unit being within a coded video sequence (CVS) that refers to the VPS, and,
   responsive to determining that one or more pictures in the access unit are cross-layer aligned, perform one of random access or layer switching using any layers of the bitstream.

9. The device of claim 8, wherein the first syntax element is signaled at a position in a NAL unit such that entropy decoding is not needed to access the syntax element.

10. The device of claim 8, wherein the first syntax element is fixed-length coded, and wherein the first syntax element is positioned in a NAL unit before any variable length coded elements in the NAL unit.

11. The device of claim 8, wherein the device is one of a video decoder or a media-aware network element.

12. The device of claim 8, wherein the device comprises a wireless communication device, further comprising a receiver configured to receive the bitstream.

13. The device of claim 12, wherein the wireless communication device comprises a wireless telephone handset and wherein the receiver is configured to demodulate, according to a wireless communication standard, a signal comprising the bitstream.

14. An apparatus for processing video, the apparatus comprising:
- means for receiving a bitstream that comprises a Video Parameter Set (VPS) and a Video Coding Layer (VCL) Network Abstraction Layer (NAL) unit, the VPS including a first syntax element, the VCL NAL unit comprising a NAL unit type syntax element, the VCL NAL unit being in an access unit;
- means for determining, based on the first syntax element being equal to 1 and the NAL unit type syntax element of the VCL NAL unit being equal to IDR_W_RADL or IDR_N_LP, that NAL unit type syntax elements of all VCL NAL units in the access unit have the same value, the VCL NAL units in the access unit being within a coded video sequence (CVS) that refers to the VPS; and
- means for performing one of random access or layer switching using any layers of the bitstream in response to determining that one or more pictures in the access unit are cross-layer aligned.

15. The apparatus of claim 14, wherein the first syntax element is signaled at a position in a NAL unit such that entropy decoding is not needed to access the syntax element.

16. A computer-readable storage medium storing instructions thereon that, when executed, cause one or more processors of a device for processing video data to:
- receive a bitstream that comprises a Video Parameter Set (VPS) and a Video Coding Layer (VCL) Network Abstraction Layer (NAL) unit, the VPS including a first syntax element, the VCL NAL unit comprising a NAL unit type syntax element, the VCL NAL unit being in an access unit;
- determine, based on the first syntax element being equal to 1 and the NAL unit type syntax element of the VCL NAL unit being equal to IDR_W_RADL or IDR_N_LP, that within a coded video sequence (CVS) that refers to the VPS, that NAL unit type syntax elements of all VCL NAL units in the access unit have the same value; and
- responsive to determining that one or more pictures in the access unit are cross-layer aligned, perform one of random access or layer switching using any layers of the bitstream.

17. The computer-readable storage medium of claim 16, wherein the first syntax element is signaled at a position in a NAL unit such that entropy decoding is not needed to access the syntax element.

18. A method of processing video data, the method comprising:
- determining whether a Network Abstraction Layer (NAL) unit type syntax element of a Video Coding Layer (VCL) NAL unit is equal to IDR_W_RADL or IDR_N_LP and whether NAL unit type syntax elements of all VCL NAL units in an access unit that includes the VCL NAL unit have the same value, the VCL NAL units in the access unit being within a coded video sequence (CVS) that refers to a Video Parameter Set (VPS);
- responsive to determining that one or more pictures in the access unit are cross-layer aligned, enabling the use of any layers of the access unit for random access or layer switching; and
- in response to determining that the NAL unit type syntax element of the VCL NAL unit is equal to IDR_W_RADL or IDR_N_LP and that the NAL unit type syntax elements of all the VCL NAL units in the access unit have the same value, setting a value of a first syntax element in the VPS to 1.

19. The method of claim 18, wherein the first syntax element is signaled at a position in a NAL unit such that entropy decoding is not needed to access the syntax element.

20. A device for processing video data, the device comprising:
- a memory configured to store a bitstream that includes a Video Parameter Set (VPS); and one or more processors configured to:
- determine whether a Network Abstraction Layer (NAL) unit type syntax element of a Video Coding Layer (VCL) NAL unit is equal to IDR_W_RADL or IDR_N_LP and whether NAL unit type syntax elements of all VCL NAL units in an access unit that includes the VCL NAL unit have the same value, the VCL NAL units in the access unit being within a coded video sequence (CVS) that refers to a Video Parameter Set (VPS) in the bitstream;
- responsive to determining that one or more pictures in the access unit are cross-layer aligned, enable the use of any layers of the access unit for random access or layer switching; and
- in response to determine that the NAL unit type syntax element of the VCL NAL unit is equal to IDR_W_RADL or IDR_N_LP and that the NAL unit type syntax elements of all the VCL NAL units in the access unit have the same value, setting a value of a first syntax element in the VPS to 1.

21. The device of claim 20, wherein the first syntax element is signaled at a position in a NAL unit such that entropy decoding is not needed to access the syntax element.

22. The device of claim 20, wherein the device is one of a video encoder or a post-processing unit.

23. An apparatus for processing video, the apparatus comprising:
- means for determining whether a Network Abstraction Layer (NAL) unit type syntax element of a Video Coding Layer (VCL) NAL unit is equal to IDR_W_RADL or IDR_N_LP and whether NAL unit type syntax elements of all VCL NAL units in an access unit that includes the VCL NAL unit have the same value, the VCL NAL units in the access unit being within a coded video sequence (CVS) that refers to a Video Parameter Set (VPS);
- means for enabling the use of any layers of the bitstream for random access or layer switching in response to determining that one or more pictures in the access unit are cross-layer aligned; and
- means for setting a value of a first syntax element in the VPS to 1 in response to determining that the NAL unit type syntax element of the VCL NAL unit is equal to IDR_W_RADL or IDR_N_LP and that the NAL unit type syntax elements of all the VCL NAL units in the access unit have the same value.

24. A computer-readable storage medium storing instructions thereon that, when executed, cause one or more processors of a device for processing video data to:
- determine whether a Network Abstraction Layer (NAL) unit type syntax element of a Video Coding Layer (VCL) NAL unit is equal to IDR_W_RADL or IDR_N_LP and whether NAL unit type syntax elements of all VCL NAL units in an access unit that includes the VCL NAL unit have the same value, the VCL NAL units in the access unit being within a coded video sequence (CVS) that refers to a Video Parameter Set (VPS);
- responsive to determining that one or more pictures in the access unit are cross-layer aligned, enable the use of any layers of the access unit for random access or layer switching; and
- in response to determine that the NAL unit type syntax element of the VCL NAL unit is equal to IDR_W_RADL or IDR_N_LP and that the NAL unit type syntax elements of all the VCL NAL units in the access unit have the same value, setting a value of a first syntax element in the VPS to 1.

* * * * *